(12) United States Patent
Sato et al.

(10) Patent No.: US 7,698,991 B2
(45) Date of Patent: Apr. 20, 2010

(54) SPRING-RETURN, PNEUMATIC ACTUATOR

(75) Inventors: Yoshiharu Sato, Yamanashi (JP);
Shoichi Kaji, Yamanashi (JP); Yasuyuki Nomura, Yamanashi (JP)

(73) Assignee: Kitz Corporation, Chiba (JP)

( * ) Notice: Subject to any disclaimer, the term of this patent is extended or adjusted under 35 U.S.C. 154(b) by 188 days.

(21) Appl. No.: 11/882,692

(22) Filed: Aug. 3, 2007

(65) Prior Publication Data
US 2009/0025548 A1    Jan. 29, 2009

(30) Foreign Application Priority Data

Aug. 4, 2006    (JP)    ............................. 2006-213369
Jul. 18, 2007   (JP)    ............................. 2007-186652

(51) Int. Cl.
*F01B 31/00* (2006.01)
*F15B 21/04* (2006.01)

(52) U.S. Cl. ........................................ 92/130 C; 92/82
(58) Field of Classification Search ..................... 92/82, 92/130 C, 132
See application file for complete search history.

(56) References Cited

U.S. PATENT DOCUMENTS

| 3,727,523 | A | * | 4/1973 | Gulick | ..................... 92/130 C |
| 3,880,054 | A | * | 4/1975 | Domyan | ..................... 92/130 C |
| 4,995,305 | A | * | 2/1991 | Garrigues et al. | ............. 92/132 |

FOREIGN PATENT DOCUMENTS

| JP | 3738431 | 11/2005 |
| JP | 2007-162890 | 6/2007 |

* cited by examiner

*Primary Examiner*—Michael Leslie
(74) *Attorney, Agent, or Firm*—Wenderoth, Lind & Ponack, L.L.P.

(57) ABSTRACT

A spring-return, pneumatic actuator includes a casing having therein a cylinder chamber, a housing chamber and a spring chamber and equipped therein with a piston reciprocating by air supplied and discharged from an air supply and exhaust vent on a primary side of the pistons. A piston rod is joined to the piston, and a conversion mechanism is provided for converting a reciprocating motion of the piston into a rotary motion. A spring undergoes a snap action due to the reciprocating motion of the piston, and a communication space chamber is formed via a communication part to have a predetermined volume from a secondary side to the spring chamber. The cylinder chamber has the piston and the piston rod built-in, the housing chamber has the conversion mechanism built-in and the spring chamber has the spring built-in.

12 Claims, 9 Drawing Sheets

(a)

(b)

SPRING-RETURN, PNEUMATIC ACTUATOR

BACKGROUND OF THE INVENTION

1. Field of the Invention

The present invention relates to an actuator that converts a linear motion into a rotary motion to enable operation of a rotary valve, such as a ball valve, a butterfly valve, etc. and particularly to a spring-return, pneumatic actuator capable of preventing intrusion of the ambient air.

2. Description of the Prior Art

For example, Japanese Patent No. 3738431 discloses a spring return actuator, in which compressed air is supplied to produce a forth motion of a piston. The forth motion is converted into a rotary motion of a rotary shaft with a conversion mechanism having a piston rod, and the snap action of a spring is utilized to produce a back motion of the piston rod, thereby making the rotary shaft counter-rotating.

The conventional actuator has an integral structure comprising a cylinder chamber, a spring chamber and a conversion portion that is a housing for connecting the two chambers. The cylinder chamber is provided therein with a piston and a piston rod joined to the piston. Each of the primary chamber (for the sake of convenience, called a cylinder right chamber) and the secondary chamber (for convenience sake, called a cylinder left chamber) of the piston in the cylinder chamber is equipped with an air supply and exhaust vent for introducing air into the inside of the cylinder.

To the air supply and exhaust vent of the cylinder right chamber is connected a compressed air supply source, such as a compressor, from which compressed air is supplied into the cylinder right chamber to operate the piston. On the other hand, the air supply and exhaust vent of the cylinder left chamber is adapted to discharge the air therein when compressed air has been supplied into the cylinder right chamber and to suck the ambient air in the cylinder left chamber when the spring in the spring chamber has been snapped back.

When the compressed air is supplied into the cylinder right chamber during the course of the actuator operation, an output shaft within the housing is rotated with the movement of the piston and piston rod. At this time, since the air in the cylinder left chamber is discharged to the exterior via the air supply and exhaust vent, the pressure in the cylinder is prevented from increasing to a positive pressure, thereby enabling the piston rod to be operated. On this occasion, the spring is pushed by a spring retainer with the movement of the piston rod, thereby being compressed.

When the supply of the compressed air into the cylinder right chamber is then interrupted to elongate the spring by means of its snap action, the piston rod is operated in the direction opposite to that at the time the compressed air is supplied. As a result, the output shaft is rotated in the direction opposite to that at the time of the operation. At this time, the compressed air in the cylinder right chamber is discharged, whereas the external atmosphere is sucked in the cylinder left chamber to prevent the cylinder left chamber from decreasing to a negative pressure, thereby enabling the piston rod to be operated.

Thus, the conventional actuator of Japanese Patent No. 3738431 is intended to prevent the pressure in the cylinder from being varied through positive supply and discharge of the air to keep the output shaft torque substantially constant and, in particular, to suck the external atmosphere in the cylinder via the air supply and exhaust vent at the time of the spring snap action, thereby preventing the cylinder interior from being brought to a vacuum state. In addition, the conventional actuator is provided with a vent port communicating with the spring chamber so as not to fluctuate the pressure in the spring chamber due to a large variation in internal volume of the spring chamber made at the time of the spring compression and elongation, thereby enabling the air in the spring chamber to be positively supplied or discharged via the vent port.

JP-A 2007-162890 discloses an actuator for a valve, in which a circulating current pipe disposed outside a cylinder is connected to an air supply and exhaust vent provided in the cylinder, and a pressurized air source and a check valve are provided in the circulating current pipe, whereby the ambient air is prevented from being sucked in the cylinder.

However, since the conventional actuator of Japanese Patent No. 3738431 adopts the configuration in which during the course of the back motion, the ambient air is sucked in the cylinder left chamber via the air supply and exhaust vent communicating with the external atmosphere, there is a possibility of moisture, such as seawater, rainwater, etc. and foreign material, such as dust, etc. invading the cylinder interior as being mixed with the ambient air.

For this reason, when the conventional actuator is used outdoors, there is a case where the piston cannot smoothly be operated due to the moisture and foreign matter. Particularly, when plural actuators of this type are used for a plant in a coastal neighborhood, these possibly suck therein the ambient air containing seawater and saline matter, resulting in that the cylinder interior would be prone to rusting and exhibit a high attrition rate. Furthermore, even when the spring chamber is provided therein with a vent port, similarly to the case of the cylinder, invasion of moisture, such as seawater, and foreign matter brings about a high attrition rate. Moreover, the formation of the vent port would make the contour of the actuator larger, i.e. difficult to attain compactness of the actuator, and increase the number of man-hours and parts for the actuator manufacture. These are problematic.

The invasion of moisture or foreign matter into the main body of the actuator prevents smooth reciprocation of the piston, resulting in failure to play the role as an emergency shutoff valve. While water, dust, etc. are easy to enter the actuator when the air supply and exhaust vents open upward, particularly when the direction in which the air supply and exhaust vents open is charged, the directionality of the main body of the actuator to be installed is restricted, causing a problem of limiting the places of installment of the actuator main body.

In order to prevent invasion of moisture, foreign matter, etc. it is conceivable that the inside of the actuator is subjected to coating or that the main body of the actuator is formed of an antirust material. In either case, however, a problem will arise in which the manufacturing cost is increased. On the other hand, even when the inlet of the air supply and exhaust vent is provided with a filter etc., there is a possibility of fine foreign matter passing through the filter and entering the main body of the actuator to induce an interference with the operation or of use of the filter over a long period of time inducing clogging with the dust accumulated.

In view of the above, it is conceivable that the actuator is formed into a sealed structure so as not to be exposed to the ambient air. In this case, however, the cylinder right chamber is possibly brought to a negative pressure state during the course of the back motion of the piston to pull the piston back, thereby making it difficult to normally operate the output shaft. What is conceivable in order to eliminate this problem is to adopt a structure in which the diameter of the cylinder is made larger to increase the internal volume of the cylinder right chamber, thereby suppressing a negative pressure state otherwise produced during the operation of the piston.

According to this structure, however, a problem will be posed, in which the amount of the compressed air flowing into the conversion portion consumed will be increased.

On the other hand, since JP 2007-162890 requires the circulating current pipe to be disposed outside the cylinder, it fails to satisfy the demand for making a valve actuator compact.

As different means for increasing the internal volume of the cylinder, a structure in which the axial length of the cylinder right chamber is extended is conceivable. According to this structure, however, since the cylinder elongates excessively in the lengthwise direction, desired compactness of the actuator main body will not be satisfied and the installation space will be increased. These are also problematic.

The present invention has been accomplished in order to solve the conventional problems and has as its object to provide a compact, spring-return, pneumatic actuator capable of preventing invasion of extraneous material, such as moisture, dust, etc. into the actuator main body to smoothly operate in order and also capable of suppressing a variation in pressure in the main body to smoothly operate with a prescribed torque.

SUMMARY OF THE INVENTION

To attain the above object, the present invention provides in a first aspect thereof a spring-return, pneumatic actuator comprising a casing equipped therein with a piston reciprocating by means of air supplied and discharged from an air supply and exhaust vent on a primary side of the piston. A piston rod is joined to the piston, a conversion mechanism is provided for converting a reciprocating motion of the piston into a rotary motion, and a spring undergoes a snap action by means of the reciprocating motion of the piston and a communication space chamber formed via a communication part to have a predetermined volume from a secondary side of the piston to a spring chamber having the spring built-in.

In a second aspect of the invention that includes the spring-return, pneumatic actuator of the first aspect, the casing comprises a cylinder chamber having the piston and the piston rod built-in, and a housing chamber has the conversion mechanism built-in and the spring chamber has the spring built-in.

In a third aspect of the invention that includes the spring-return, pneumatic actuator of the second aspect, the communication part comprises a through hole communicating between the secondary side and the housing chamber and a through hole communicating between the housing chamber and the piston chamber.

In a fourth aspect of the invention that includes the spring-return, pneumatic actuator of the second or third aspect, the housing chamber has a contour substantially identical with those of the cylinder chamber and the spring chamber.

In a fifth aspect of the invention that includes the spring-return, pneumatic actuator of any one of the first to fourth aspects, the communication space chamber has an internal pressure set to be an atmospheric pressure or less.

A sixth aspect of the invention that includes the spring-return, pneumatic actuator of any one of the first to fifth aspects, a check valve communicates with a space from the secondary side of the piston to the spring chamber and is capable of discharging compressed air within the space to the outside of the casing.

According to the first aspect of the invention, it is possible to provide a spring-return, pneumatic actuator capable of smoothly operating in order, with water including seawater and foreign matter including dust prevented from intruding into the communication space chamber thereof, thereby preventing rusting and deteriorating the inside thereof due to brine damage etc. and maintaining a smooth reciprocating motion of the piston and the piston rod. It is also possible to provide a compact, spring-return, pneumatic actuator capable of suppressing a variation in pressure of the communication space chamber thereof and operating with a prescribed constant operation torque. Furthermore, since the actuator is enhanced in durability, the maintenance thereof is made ready and the running cost thereof inexpensive.

According to the second aspect of the invention, it is possible to provide a spring-return, pneumatic actuator, the main body of which is formed into not a special, but a part configuration that has the same level as in a conventional part configuration, has neither a complicated inside nor a large entire size and is easy to disassemble and assemble.

According to the third aspect of the invention, it is possible to provide a spring-return, pneumatic actuator capable of securing a communication state inside the communication space chamber by means of a simple machine work and of stably operating within a prescribed stroke, with a variation in pressure inside the main body suppressed while keeping the inside in a substantially hermetic state.

According to the fourth aspect of the invention, it is possible to provide a spring-return, pneumatic actuator enabling the entire casing to be formed into a cylindrical shape having no excessively protruding part, thereby making it compact.

According to the fifth aspect of the invention, it is possible to provide a spring-return, pneumatic actuator capable of suppressing a variation in pressure during the piston stroke to the minimum to make the influence on the output torque of the output shaft, thereby enabling a decrease of the output torque to be suppressed.

According to the sixth aspect of the invention, it is possible to provide a spring-return, pneumatic actuator capable of maintaining its smooth operation when the compressed air is supplied or discharged. In addition, even when the internal pressure of the cylinder on the secondary side of the piston has increased to the atmospheric pressure through failure to maintain a negative pressure state of the cylinder interior during the piston operation, the check valve is used to discharge the air at the time the volume on the secondary side has been made minimum, thereby enabling the volume when having been enlarged to become under a negative pressure.

The above and other objects, characteristic features and advantages of the present invention will become apparent to those skilled in the art from the description to be given herein below with reference to the accompanying drawings.

DETAILED DESCRIPTION OF THE PREFERRED EMBODIMENTS

Figure 1:
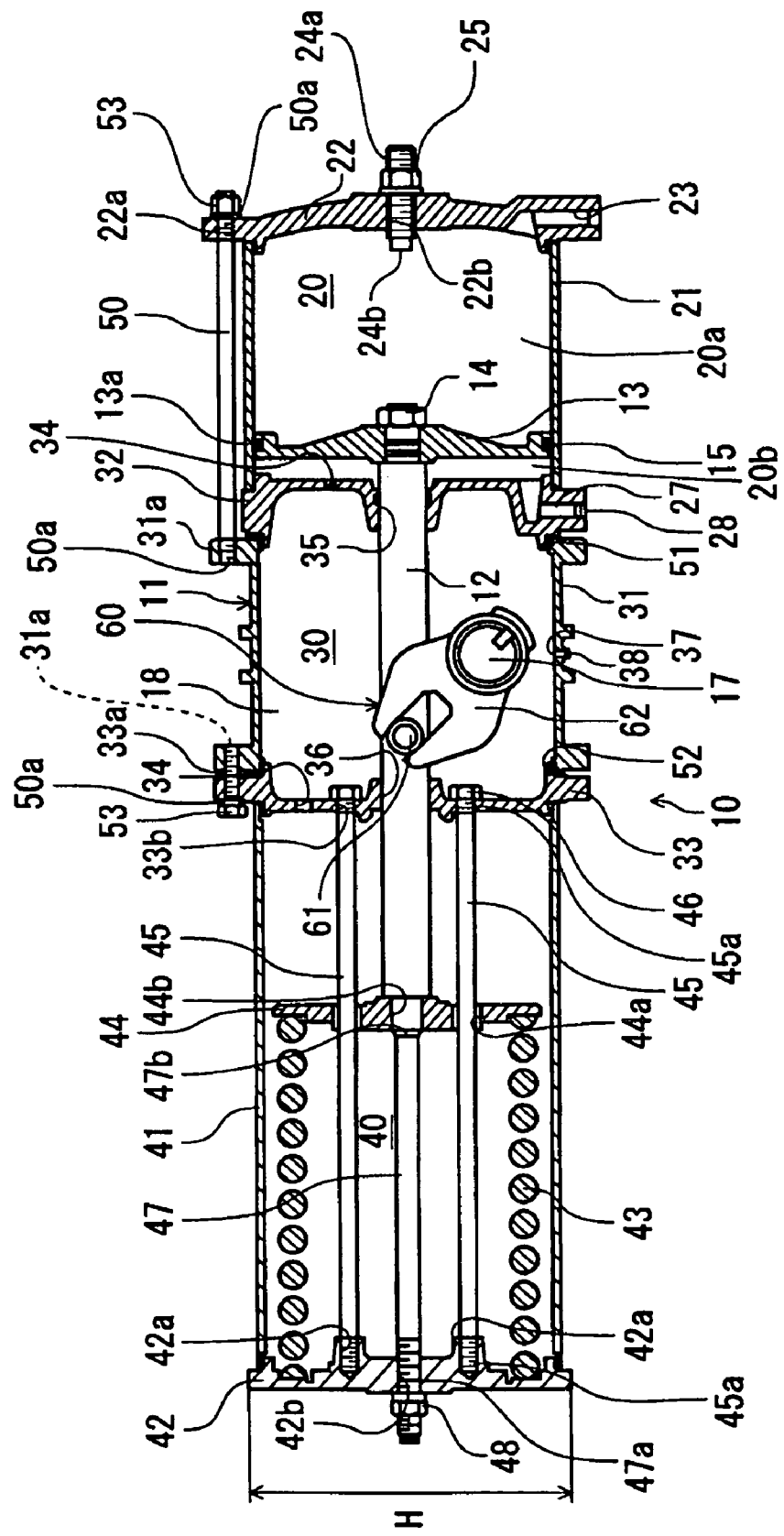
FIG. 1 is a cross section illustrating a spring-return pneumatic actuator in which a valve is in a fully open condition.
Figure 2:
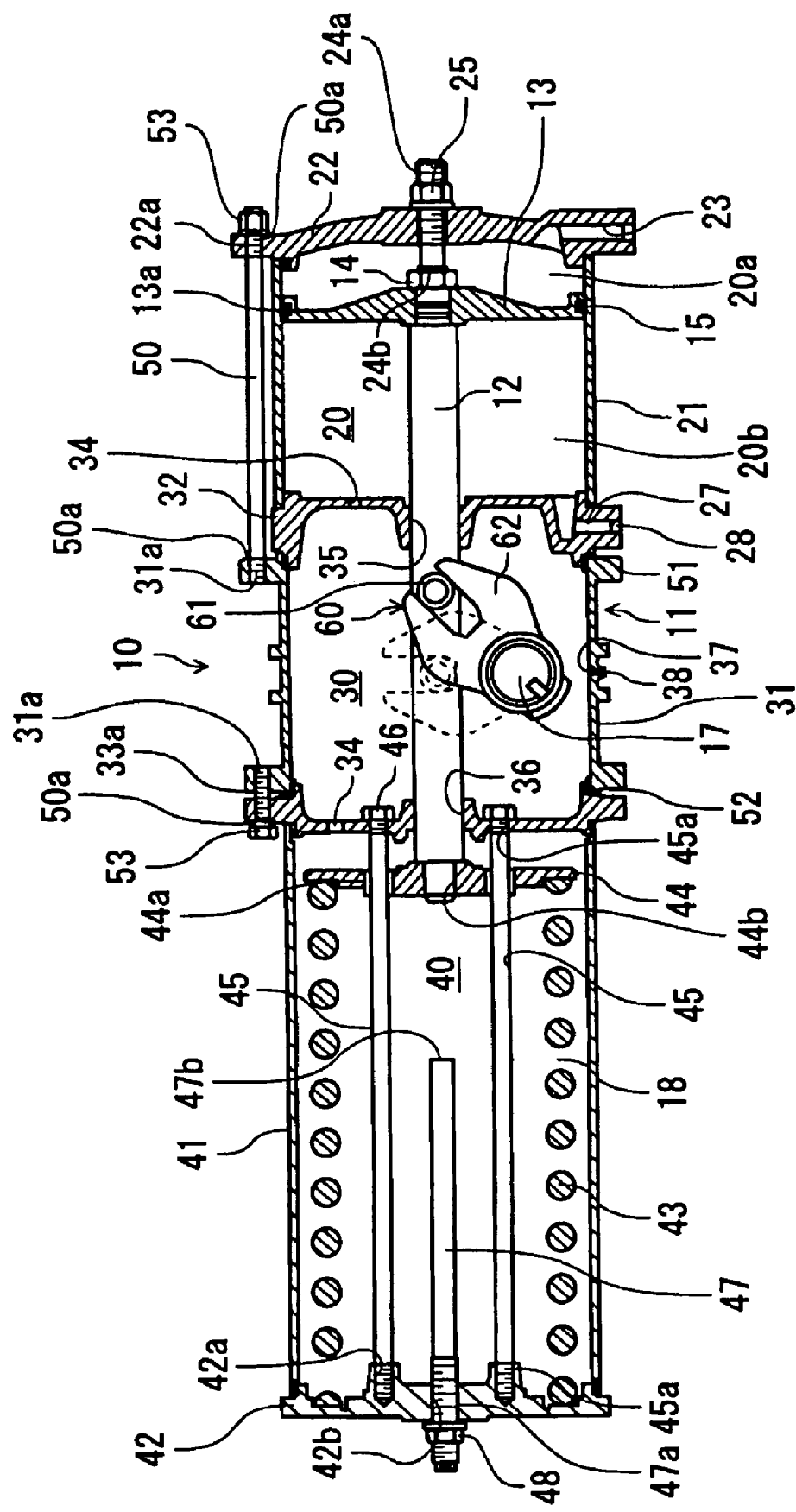
FIG. 2 is a cross section illustrating the spring-return pneumatic actuator in which the valve is in a fully closed condition.
Figure 3:
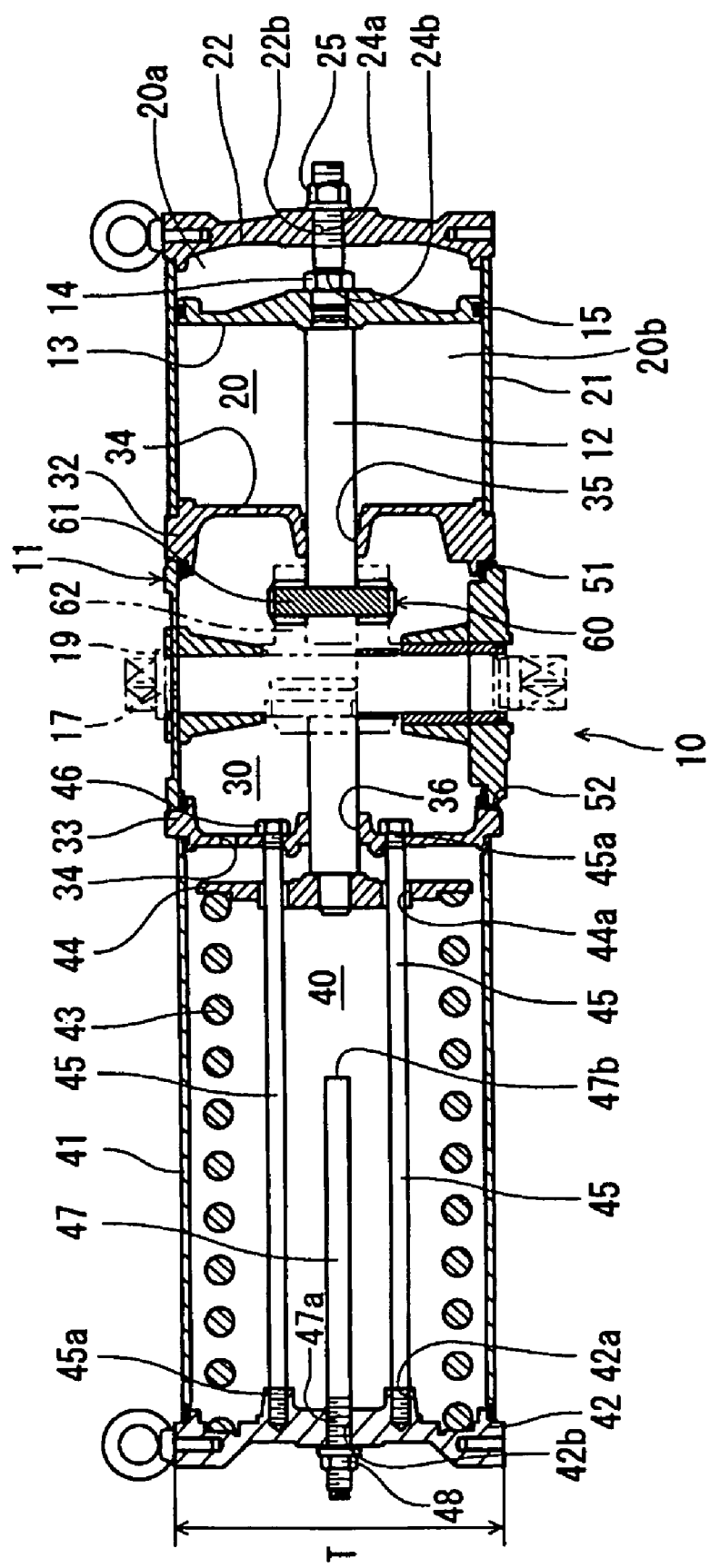
FIG. 3 is a partially cutaway lateral cross section of FIG. 2.

One embodiment of the spring-return, pneumatic actuator according to the present invention and the operation thereof will be described in detail hereinafter with reference to the accompanying drawings. The spring-return, pneumatic actuator of the present invention is mounted on a rotary valve (not shown), such as a ball valve, a butterfly valve, etc. to operate the rotary valve by means of an air pressure or a snap action of a spring. In FIG. 1 through FIG. 3, an actuator main body 10 has a casing 11 comprising a cylinder chamber 20, a housing chamber 30 and a spring chamber 40 that are integral with one another. The cylinder chamber 20 is disposed on one side of the housing chamber 30, and the spring chamber 40 is disposed on the other side of the housing chamber 30. As described later, the widths H and heights T of the cylinder chamber 20, housing chamber 30 and spring chamber 40 in the casing 11 are set substantially identical, thereby forming the entire actuator into a compact structure.

A piston 13 and a piston rod 12 are built in the cylinder chamber 20. The piston 13 is firmly joined to the piston rod 12 with a nut 14, and the outer periphery of the piston is formed therein with a fitting groove 13a. A seal ring 15 is fitted in the fitting groove 13a to seal between the outer periphery of the piston 13 and the inner wall of the cylinder chamber 20 when the piston rod 12 reciprocates within the cylinder chamber 20. With this configuration, the interior of the cylinder chamber 20 is divided across the piston 13 into two spaces 20a and 20b, one on a primary side and the other on a secondary side. These spaces 20a and 20b are stopped up (sealed) so as not to induce any leakage, and the piston 13 is slidable in these spaces. Here, the "primary side" means the side of an air supply and exhaust vent 23 that will be described later to which a force necessary for the forth motion of the piston rod 12 is supplied, whereas the "secondary side" means the side of the spring chamber 40 to which a force necessary for the back motion closest to the piston rod 12 is supplied.

The cylinder chamber 20 is defined by a cylinder case 21, a cylinder cover 22 and a rod guide 32 of the housing chamber 30, and the cylinder cover 22 is attached as a lid to the end side of the cylinder case 21.

The space 20a of the cylinder chamber 20 on the primary side is provided with the air supply and exhaust vent 23 to which a compressed-air-supply source (not shown), such as a compressor, is connected. When the compressed air is supplied from the compressed air supply source into the primary side space 20a via the air supply and exhaust vent 23, the piston 13 and piston rod 12 are pushed toward the secondary side to produce a forth motion and, when a spring 43 described later is elongated, produce a back motion. At this time, the compressed air accumulated within the cylinder chamber 20 is discharged from the air supply and exhaust vent 23.

The cylinder cover 22 is formed at the center thereof with a female thread 22b with which a male thread 24a of a stopper bolt 24 is screw-engaged. The male thread 24a has the other end thereof screw-engaged with a nut 25 with which the stopper bolt 24 is positioned and fixed. By changing the position of the nut 25 to be fastened, it is possible to adjust the position of a collision part 24b of the stopper bolt 24 at its distal end. When the piston rod 12 produces a back motion, the back end of the piston 12 collides against the collision part 24b to assume a dead position of the back motion stroke of the piston rod 12. Thus, the dead position is adjustable.

The housing chamber 30 is defined by a housing case 31 and opposite rod guides 32 and 33 and has a conversion mechanism 60 built-in. O-rings 51 and 52 seals between the housing case 31 and the rod guides 32 and 33.

The rod guides 32 and 33 serve to guide the piston rod 12 and have slide holes 35 and 36, respectively, for permitting a sliding motion of the piston rod 12 therein. Each of the rod guides 32 and 33 has formed therein an appropriate number of through holes 34 serving as communication parts for allowing the housing chamber 30 to communicate with the secondary side space 20b of the cylinder chamber 20 and for allowing the housing chamber 30 to communicate with the spring chamber 40. Since the through holes 34 constitute flow paths for the compressed air, the larger the diameter thereof, the more easily the compressed air passes therethrough. Therefore, the through holes 34 of larger diameter can sufficiently suppress a variation in pressure, make the operation speed of the actuator rapider and exhibit their higher ability as emergency shutoff valves. For these reasons, it is better to form the through holes 34 to have a diameter as large as possible and increase the number thereof in due consideration, of the strength etc. of the actuator. Also, in order to prevent clogging of the through holes 34 with oil coated on the conversion mechanism 60 in the housing chamber 30 and on the spring 43 in the spring chamber 40, the through holes 34 preferably have a larger shape and are provided in an increased number.

The conversion mechanism 60 can convert the reciprocating motion of the piston rod 12 into a rotary motion and output the rotary motion up to an output shaft 17. It comprises a pin 61 fixed to the piston rod 12 and a scotch yoke 62 fixed to the output shaft 17. The pin 61 pushes the scotch yoke 62 forward or backward during the reciprocating motion of the piston rod 12 to rotate the scotch yoke 62. The rotation of the scotch yoke 62 rotates the output shaft to rotate a valve shaft of a ball valve or butterfly valve (not shown) connected to the output shaft 17 up to a valve open state or valve closed state.

While the conversion mechanism comprises the pin 61 and scotch yoke 62 in this embodiment, another conversion mechanism, such as a rack-and-pinion mechanism, gear mechanism, etc. may be adopted without making restrictions on the mode thereof insofar as the actuator main body can constitute a spring-return, pneumatic actuator.

The spring chamber 40 is a storage chamber for the spring 43 and is defined by a spring case 41 formed into a pipe, a spring cover 42 and the rod guide 33 of the housing chamber 30. The spring cover 42 is attached to the end of the spring case 41.

When assembling the actuator main body 10, the piston rod 12 is inserted into the housing case 11, with the scotch yoke 62 engaged with the pin 61, and the rod guide 32 is attached from the cylinder chamber 20 to the piston rod 12. At this time, the back end of the piston rod 12 is inserted and fitted in the slide hole 35 of the rod guide 32. Then, the piston 13 having the seal ring 15 mounted thereon is fitted in a contracted part at the back end of the piston rod 12, and the nut 14 is screw-engaged with the contracted part of the piston rod 12, thereby integrating the piston 13 and the piston rod 12.

Subsequently, the cylinder case 21 is temporarily attached to the rod guide 32 by insertion thereon. At this time, the piston 13 is slidable within the cylinder case 21, with the seal ring 15 brought into intimate contact with the inner circumference of the cylinder case 21. With this state maintained, male threads 50a at one end of a rod 50 are screw-engaged with female threads 31a of the housing case 31, the other end of the rod 50 is inserted into a through hole 22a of the cylinder cover 22 and a nut 53 is screw-engaged with the other end of the rod 50, thereby integrating these component parts. The rod 50 is fixed at plural places, i.e. about four places, for example.

On the other hand, the side of the spring chamber 40 is unitized beforehand in the following manner. A plurality of tie rods 45 are installed by means of screw engagement between their male threads 45a at one end thereof and female threads 42a of the spring cover 42 and, with the spring 43 comprising a compressed coil spring disposed a prescribed attachment position around the outer peripheries of the tie rods 45, a spring retainer 44 is installed from the other end of the tie rods 45 by passing their insertion holes 44a onto the tie rods 45. The spring retainer 44 is formed in the center thereof with a fitting aperture 44b in which the distal end of the piston rod 12 can be fitted.

Subsequently, one end of the tie rod 45 is inserted into a through hole 33b of the rod guide 33 and, with the tie rod 45 disposed at a prescribed position within the spring case 41, engaged at the male thread 45a thereof with a nut 46 from above the rod guide 33 to integrate the rod guide 33 and the tie rod 45 into a unit having the spring chamber 40 therein. As a result, the spring 43 is mounted between the spring retainer 44 and the spring cover 42 in a compressed state enabling its snap action and, as shown in FIG. 2, can produce a back motion enabling the piston rod 12 to be moved rightward via the spring retainer 44.

Ultimately, the integrated body of the cylinder chamber 20 and the housing chamber 30 is temporarily attached to the unit having the spring chamber 40, with the distal end of the piston rod 12 fitted in the fitting aperture 44b. At this time, a through hole 33a of the rod guide 33 and female threads 31a of the housing case 31 on the left side in FIG. 1 are aligned in position and a bolt 53 is screw-engaged with the female threads 31 from the side of the through hole 33a, thereby integrating the actuator main body 10.

The spring cover 42 on the closed side of the spring case 41 is formed at the center thereof with female threads 42b with which male threads 47a of a adjusting rod 47 are screw-engaged. The male threads 47a are also screw engaged with a nut 48, by which the adjusting rod 47 is positioned and fixed. As a result, an abutting part 47b of the adjusting rod 47 can be adjusted in position and, during the forth motion of the piston rod 12, the distal end of the piston rod 12 is abutted on the abutting part 47b to enable the adjustment of the forth motion stroke. Thus, the piston rod 12 reciprocates, with the range of stroke thereof regulated by the stopper bolt 24 and the adjusting rod 47.

As described above, the spring-return, pneumatic actuator is provided in the casing 11 with the piston 13, piston rod 12, conversion mechanism 60 and spring 43, allows the space from the space 20b on the secondary side of the piston 13 in the cylinder chamber 20 to the spring chamber 40 through the housing chamber 30 to have a prescribed volume to constitute the communication space chamber 18 of the prescribed volume via the through holes (communication parts) 34.

By positively forming the communication space chamber 18 within the casing 11 by means of the through holes 34, it is made possible to secure the large volume in the casing 11 from the piston 13 to the secondary side, thereby enabling the pressure in the secondary side space 20b in the cylinder chamber 20 to smoothly escape toward the side of the housing chamber 30 and spring chamber 40 with the movement of the piston 13 and also enabling the pressure in the housing chamber 30 or spring chamber 40 to be smoothly taken in the secondary side space 20b in the cylinder chamber 20. Thus, by varying the pressure within the wide communication space chamber 18 within the casing 11, the variation in pressure within the communication space chamber 18 can be suppressed without need to increase the diameter or axial length of the cylinder chamber 20. As a result, it is possible to make the compressibility of the internal volume during the forth and back motions of the piston 13 as small as possible and the influence of the pressure on the output torque of the output shaft 17 smaller. In order to make the influence of the pressure on the output torque of the output shaft 17 smaller, the volume of the communication space chamber 18 is made preferably as large as possible, but is made maximal in due consideration of the property of compactness of the actuator.

In the present embodiment, the communication space chamber 18 comprises a combination of the space 20b in the cylinder chamber 20 on the secondary side of the piston 13, the space in the housing chamber 30 and the space in the spring chamber 40. It is the sum of the secondary side space 20b kept narrow when the piston has produced a forth motion as shown in FIG. 1, the space in the housing chamber 30 or the space in the spring chamber 40 and the sum of the secondary side space 20b kept wide when the piston has produced a back motion as shown in FIG. 2, the space in the housing chamber 30 and the space in the spring chamber 40. As the communication space chamber, any other embodiment than the present embodiment can be adopted insofar as it is formed in a space in the casing 11 having the conversion mechanism 60 and spring 43 disposed therein other than the primary side space 20a to which the compressed air is to be supplied, whereby the structure or shape of the casing 11 may be changed. As a result, adjoining chambers of the cylinder chamber 20, housing chamber 30 and spring chamber 40 may be made integral, for example, or the adjoining chambers may be formed of the same material or disposed in an actuator having an appropriate internal structure. Also, in this case, in order to form a communication space chamber, a communication part (hole) 34 is formed when necessary among the secondary side space 20b, housing chamber 30 and spring chamber 40.

The communication space chamber 18 thus formed is kept substantially sealed without at least the ambient air invading (entering) therein. In particular, the rod guide 32 constituting the cylinder chamber 20 is formed with an aspiration hole 27 as has been adopted in a conventional actuator and as shown in FIG. 1. In the present embodiment, the aspiration hole is stopped up with a plug 28.

In addition, the housing case 31 is formed therein with an exhaust port 37 that is covered with a cap 38. Herein, the housing case 31 is sealed relative to the rod guides 32 and 33, respectively, with gaskets (not shown) and relative to the output shaft 17 with seal packing 19 (FIG. 3) provided at the upper part of the output shaft 17 and packing (not shown) provided at the lower part of the output shaft 17. Furthermore, the spring case 41 is sealed relative to the spring cover 42 and rod guide 33, respectively, with gaskets not shown. Moreover, the spring 42 and the adjusting rod 47 are kept sealed with packing or a gasket not shown.

In the actuator main body 10 of the present embodiment, the housing case 31 constituting the housing chamber 30 is set to have substantially the same contour as the cylinder case 21 constituting the cylinder chamber 20 and as the spring case 41 constituting the spring chamber 40 (refer to the width H in FIG. 1 and the height T in FIG. 3). As a result, the contour of the housing case 31 can be made large to widen the communication space chamber 18 and enable the actuator main body 10 to be formed into a substantially cylindrical contour to maintain it compact.

Since the housing chamber in Japanese Patent No. 3738431 serves merely as that for accommodating a conversion mechanism, it has a slender structure provided with a larger number of concave portions as compared with the cylinder chamber or spring chamber to attain the property of compactness of the actuator. On the other hand, in the actuator 10 according to the present embodiment, the size of the housing case 31 is set at a maximum so as not to protrude excessively from the contours of the cylinder case 21 and spring case 41 to maximize the volume of the housing chamber 30.

The communication space chamber 18 of the actuator 10 according to the present embodiment is formed to have a volume such that a pressure increase before and after the piston 13 makes a stroke in the cylinder chamber 20 falls within 0.02 MPa. By suppressing the pressure increase to a minute pressure of 0.02 MPa or less, as described above, an otherwise possible adverse affect on the output torque of the output shaft 17 can substantially be avoided. In order to suppress the pressure increase to 0.02 MPa or less, the housing chamber 30 and spring chamber 40 have to be designed so as to satisfy this requirement. Since the upper limit of the pressure increase varies depending on the shape, specifications and size of an actuator, the volume of the communication space chamber 18 is set so that the pressure increase may be suppressed to a prescribed value or less determined in accordance with an actuator to be formed.

Though the pressure in the communication space chamber 18 is set to be less than the atmospheric pressure or less, when assembling the actuator main body 10, it can appropriately be selected whether the pressure in the communication space chamber 18 should be set to be a negative pressure less than the atmospheric pressure or a positive pressure more than the atmospheric pressure.

When adopting the specifications causing the communication space chamber 18 to be under a negative pressure, the pressure in the communication space chamber 18 is released to the outside of the actuator main body 10 during the compression motion of the spring 43 (at the time the compressed air is being supplied) and, when the spring 43 has been brought to a prescribed compressed state (fully open condition of the valve body as shown in FIG. 1, for example, in consequence of the rotation of the output shaft 17), the communication space chamber 18 blocks off the ambient air to keep the space chamber 18 sealed. As a result, since the volume in the communication space chamber 18 is increased at the time the spring 43 has produced a snap action as shown in FIG. 2, the communication space chamber 18 can be brought to a negative pressure state at all times during the sliding motion of the piston 13.

On the other hand, when adopting the specifications causing the communication space chamber 18 to be under a positive pressure, the space chamber 18 has the ambient air (atmospheric pressure) taken therein during the snap action (driving motion) of the spring 43 and, when the spring 43 has been brought to a prescribed snapped state (fully closed condition of the valve body as shown in FIG. 2, for example, in consequence of the rotation of the output shaft 17), the communication space chamber 18 blocks off the ambient air to keep the space chamber 18 sealed. As a result, since the volume in the communication space chamber 18 is decreased at the time the spring 43 has produced a compression motion (driving motion by compressed air), the communication space chamber 18 can be brought to a positive pressure state at all times during the sliding motion of the piston 13. Incidentally, while, in the present embodiment, the setting is such that the compressed motion of the spring 43 produces a valve open state and that the snap action thereof provides a valve closed state, the reverse setting may be adopted.

Figure 13:
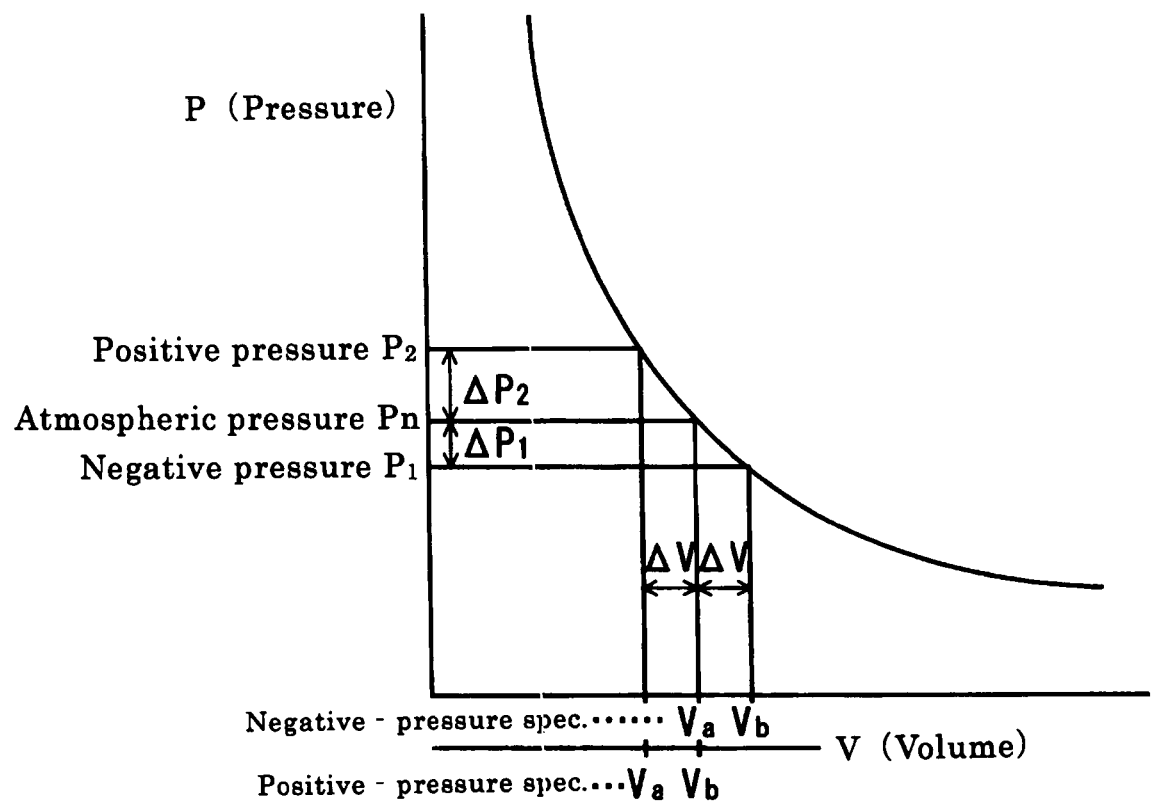
FIG. 13 is a graph showing the amount of pressure varied relative to the amount of volume varied.

In the actuator main body 10, it is desirable to adopt the aforementioned specifications causing the communication space chamber 18 to be under a negative pressure. The reason for it will be described. In the Boyle-Charle's law (P (pressure)×V (volume)/T (absolute temperature)=a constant value), when the absolute temperature is constant, the volume V and the pressure P assume an inversely proportional relationship as shown in FIG. 13. This is expressed as PV=P'V' (wherein P and V stand for the initial pressure and initial volume, respectively, and P' and V' for the pressure and volume after the operation). Here, when the volume of the communication space chamber 18 in the actuator main body 10 is given as Va in the fully valve-open state (FIG. 1) and as Vb in the fully valve-closed state (FIG. 2), a volume variation $\Delta V$ from the fully open state to the fully closed state of the actuator main body 10 is expressed as $\Delta V = Vb - Va$.

In the negative-pressure specifications, it is set that the pressure in the volume Va of the communication space chamber 18 in the fully valve-open state shown in FIG. 1 is the atmospheric pressure Pn and that the pressure variation from the pressure (negative pressure) $P_1$ in the volume Vb of the communication space chamber 18 in the fully valve-closed state shown in FIG. 2 is $\Delta P_1$. On the other hand, in the positive-pressure specifications, it is set that the pressure in the volume Vb of the communication space chamber 18 in the fully valve-closed state shown in FIG. 2 is the atmospheric pressure Pn and that the pressure variation from the pressure (positive pressure) $P_2$ in the volume Va of the communication space chamber 18 in the fully valve-open state shown in FIG. 1 is $\Delta P_2$.

When comparing the pressure variation relative to the volume variation $\Delta V$ in the fully valve-open state with that in the fully valve-closed state, it is found from FIG. 13 that even when the volume variations $\Delta V$ in the negative-pressure and positive-pressure specifications are the same, the pressure variation $\Delta P_1$ in the negative-pressure specifications relative to the same volume variation $\Delta V$ is smaller than the pressure variation $\Delta P_2$ in the positive specifications relative thereto ($\Delta P_1 < \Delta P_2$). Thus, when comparing the negative-pressure specifications with the positive-pressure specifications, while the volume variations $\Delta V$ are the same, the pressure variation $\Delta P$ relative to the volume variation $\Delta V$ is smaller in the negative-pressure specifications than in the positive-pressure specifications. Since the smaller the internal pressure, the smaller the influence on the output torque of the output shaft 17, the adoption of the negative-pressure specifications is optimum for the structure under discussion.

As described above, in the spring-return, pneumatic actuator of the present invention, the space 20b on the secondary side of the piston 13 is allowed to communicate with the housing chamber 30 and spring chamber 40 via the communication space chamber 18 that is kept in a substantially intimately sealed state. Therefore, the actuator main body 10 does not suck the ambient atmosphere therein to enable the actuator main body 10 to be operated in a so-called apneic state. That is to say, even when the actuator main body 10 is disposed outdoor, since it does not suck therein any foreign matter including moisture and dust, there is no case where the operation thereof will be obstructed thereby. Even when it is used in a coastal neighborhood, in particular, it exerts a completely antirust effect onto the interior thereof. Furthermore, since the actuator of the present invention is provided with no suction port for the ambient atmosphere, the attachment directionality thereof does not allow water and dust to be sucked therein. Thus, since it has a freedom from the attachment directionality, it can be installed at any of various places. Moreover, since it is not necessary to apply a coating onto the interior thereof or to be wholly formed of an antirust material, it is possible to suppress an increase in the manufacturing cost and to prevent invasion of water or dust without requiring it to be provided with a filter.

In the actuator main body 10 of the present invention, since the communication space chamber 18 is formed to have a prescribed volume capable of suppressing a pressure increase during the reciprocation of the piston 13 to 0.02 MPa or less, there are few internal pressure variations in spite of the intimately sealed structure thereof and the pressure variation in the housing chamber 30 having the conversion mechanism 60 and output shaft 17 built therein is small. Thus, since the piston 13 is difficult to draw back and the output shaft 17 is difficult to malfunction in rotation, it is made possible to stably open and close a valve with a prescribed torque. In addition, since the cylinder case 21 and other component parts do not become large-sized, it is possible to maintain the compact property of the actuator main body 10 and install the actuator main body 10 in a narrow and small installation space. Furthermore, it can easily be fabricated without being subjected to any complicated machine work.

Figure 4:
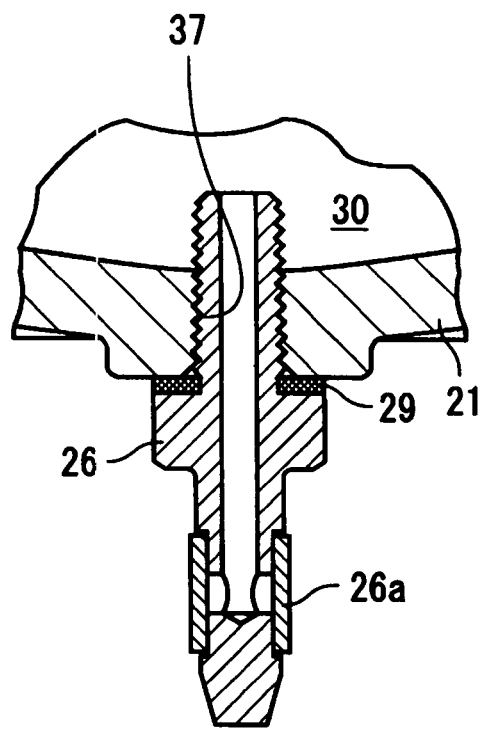
FIG. 4 is an enlarged cross section showing a check valve mounted.
Figure 5:
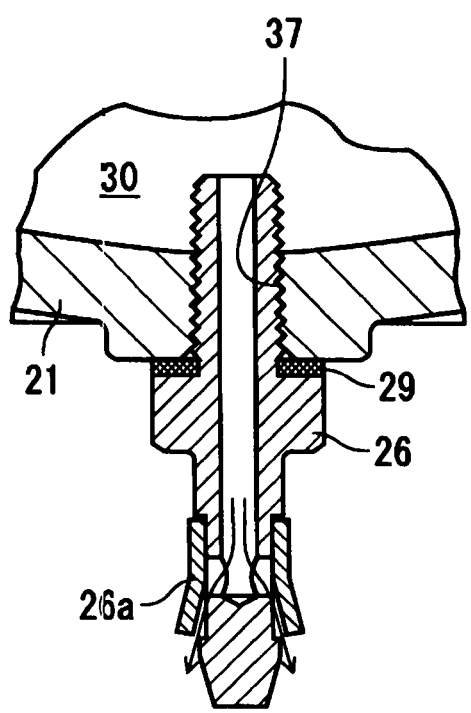
FIG. 5 is an enlarged cross section showing the check valve of FIG. 4 in an open condition.

The actuator main body 10 may be provided with a check valve 26, as shown in FIG. 4, to allow communication between the cylinder chamber 20 and the space 20b on the secondary side of the piston 13, permit only the compressed air therein to be discharged to the outside and prevent suction of air. The check valve 26 has a tube valve body 26a made of rubber and is maintained closed with the valve body 26a under an ordinary condition. The valve body 26a is opened as shown in FIG. 5 when the air is to be discharged, thereby discharging the pressure in the secondary side space 20b by means of the piston 13 in the cylinder chamber 20.

When the actuator main body 10 has been provided with the check valve 26, therefore, the check valve 26 discharges the invading air to enable securing the difference in pressure across the piston 13 and, even when the compressed air enters the secondary side space 20b from the space 20a on the primary side of the piston 13 due to the lowered sealing property between the piston 13 and the cylinder chamber 20 by dint of the deterioration of the seal ring 15, a smooth operation can be made, with the pressure difference between the primary and secondary sides retained. In addition, even when the seal ring 15 has been damaged, since the check valve 26 can discharge the air to prevent a pressure increase, the actuator main body 10 is excellent in safety.

Furthermore, in the actuator main body 10 adopting the negative-pressure specifications, even when the negative pressure in the communication space chamber 18 is elevated to the atmospheric pressure in the state of FIG. 2 in which the compressed air has been discharged, the actuator main body 10 is operated until the state of FIG. 1 in which the compressed air is supplied and, in this state, the check valve 26 is utilized to discharge the air to bring the communication space chamber 18 to an atmospheric pressure state. Subsequently, the piston 13 is operated until the state of FIG. 2, thereby discharging the compressed air to restore the interior of the communication space chamber 18 to the negative pressure state.

The check valve 26 can be attached to the exhaust port 37 formed in advance in the housing case 31 of the housing chamber 30. The exhaust port 37 is covered with the cap 38 under an ordinary condition and, when the cap 38 is removed, the check valve 26 can be attached to the exhaust port 37. The main body of the check valve 26 can be formed of a metal or resin and, as shown in FIG. 4, can be attached to the housing chamber 30 via a gasket 29 by means of screw engagement etc. and fulfills its own function while preventing the ambient air from entering the housing chamber 30.

Figure 6:
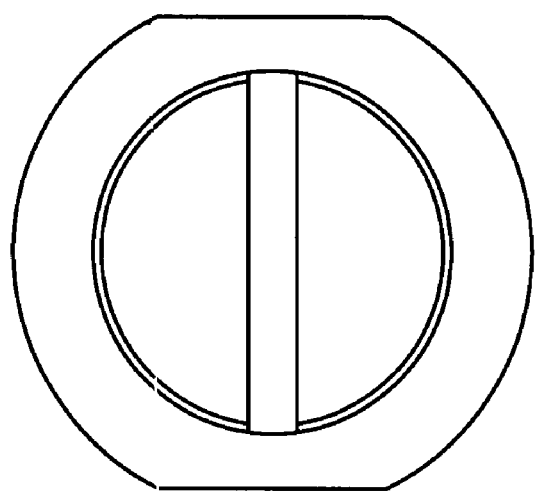
FIG. 6($a$) is a plan view of another check valve, and FIG. 6($b$) a cross section of the check valve of FIG. 6($a$).
Figure 6:
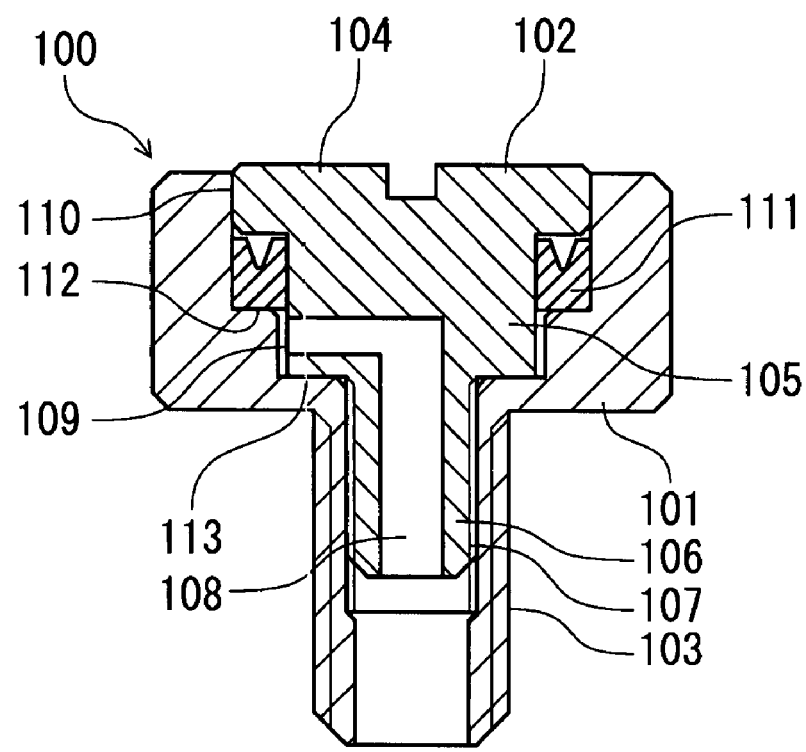

FIG. 6 shows another example of check valve 100 using a seal member 111 having a U-shaped cross section. The seal member 111 is disposed so that its U-shaped opening may be directed toward the outside of the actuator, thereby enabling rapid discharge of the pressure in the actuator and infallible prevention of the invasion of the air from the outside of the actuator. The check valve 100 of FIG. 6 comprises the seal member 111, an external bolt member 101 and an internal bolt member 102 inserted into the external bolt member 101. The seal member 111 is intimately retained between the inner circumference of the external bolt member 101 and the outer circumference of the internal bolt member 102. Incidentally, the external bolt member 101 is provided on its lower circumference with male threads 103 for screw-engagement with the cylinder case 21 of the actuator.

The check valve 100 has its height suppressed by inserting the internal bolt member 102 into the external bolt member 101. With this, it is possible to prevent interference between the check valve 100 and a part-fitting plate (not shown) fixed onto the side surface of the cylinder case 21 of the actuator.

The internal bolt member 102 comprises a flange part 104, a seal member-retaining part 105 and cylindrical part 106 that are disposed in the order mentioned from above. The cylindrical part 106 is provided on the outer periphery thereof with male threads 107 for permitting the internal bolt member 102 to be screw-engaged with and fixed to the inner circumference of the external bolt member 101. In addition, the internal bolt member 102 is formed therein with a through hole 108 for allowing the inside of the external bolt member 101 to communicate with the outer circumference of the seal member-retaining part 105 of the internal bolt member 102. An annular gap 109 is formed between the inner circumference of the external bolt member 101 and the outer circumference of the seal member-retaining part 105 to which the through hole 108 opens. The seal member 111 is positioned at an upper part of the annular gap 109 and disposed on an inner circumferential upper step part 112 of the external bolt member 101. Incidentally, the bottom of the seal member-retaining part 105 of the internal bolt member 102 is in intimate contact with an inner circumferential lower step part 113 of the external bolt member 101. Furthermore, another annular gap 110 is formed between the outer circumference of the flange part 104 of the internal bolt member 102 and the inner circumference of the external bolt member 101.

With this configuration, the pressure in the communication space chamber 18 of the actuator main body passes through the through hole 108 and annular gap 109 of the check valve 100 and promptly reaches the seal member 111. As a result, the seal member 111 is caused to release its sealing function relative to the internal and external bolt members 102 and 101, thereby allow the pressure to pass through the annular gap 110 and be discharged out of the actuator main body. Upon completion of this discharge, the seal member 111 restores its sealing function relative to the internal and external bolt members 102 and 101, thereby preventing invasion of the ambient air into the actuator main body infallibly. While another example of check valve has been described in the foregoing, any other check valve having a structure in which a valve body comprising a ball (not shown) is subjected to spring snap action, thereby fulfilling its function as a check valve or any other such structure may be adopted, for example.

Also, in FIG. 3, as the seal packing 19 provided on the upper part of the output shaft 17, U-packing having a U-shaped cross section or packing of dust-seal structure (not shown), for example, may be used to enable only the discharge of the air within the communication space chamber 18 and the suction prevention of the external atmosphere, thereby fulfilling the same effect as in the case of the provision of the check valve 26.

Furthermore, though now shown in the drawings, similarly to the case of the cylinder chamber 20, the spring chamber 40 may have therein an exhaust port and, in this case, the air can be discharged from this exhaust port in addition to the ordinary supply and discharge of the compressed air to the cylinder chamber 20, making it possible to operate the piston rod 12 while aiding the motive energy in accordance with the intensity of the snap action of the spring 43. Furthermore, the actuator main body may be provided with a detector valve (not shown) with which occurrence of the pressure leaked from the actuator main body 10 is detected to enable confirmation of the pressure in the main body.

The provision of a stopper for intermediate valve travel on the back-pressure side of the piston in the cylinder chamber is utilized for an actuator for a two-stage switching valve capable of setting not only the fully open and closed conditions, but also the intermediate valve travel condition (as disclosed in JP-A HEI 7-269511, for example).

Furthermore, a bypass pipe (not shown), when being provided in FIG. 1 for communication between the secondary side space 20b and the spring chamber 40, can fulfill a function as the communication part. The bypass pipe has to be designed so as to contribute to the property of compactness of the actuator main body.

Example

Tests for measuring the pressure and torque of the actuator were conducted to study optimal specifications thereof. Comparing the values measured with the theoretical pressure and torque, characteristics of the actuator at the time of the actual operation were grasped.

Figure 7:
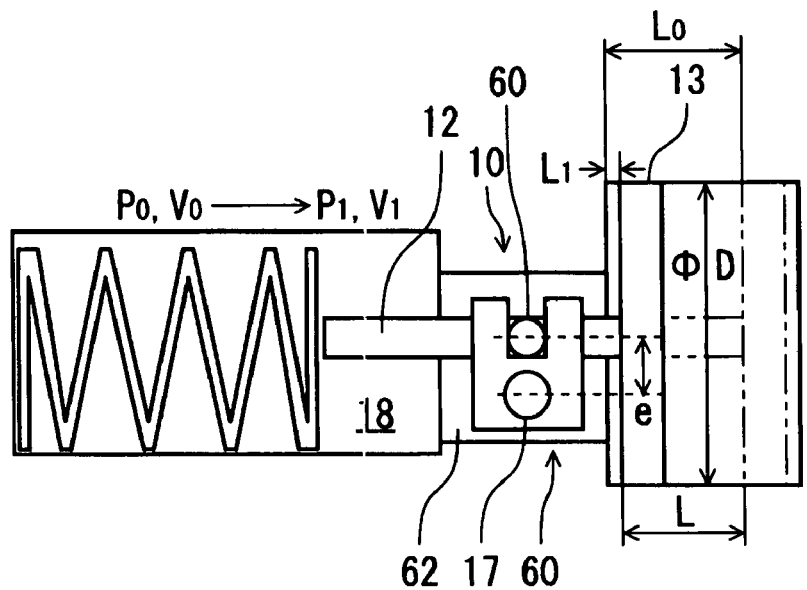
FIG. 7 is a schematic view showing an actuator under a pressure and torque measurement test.

In FIG. 7, based on PV/T=a constant value according to the Boyle-Charle's law, a general formula of $P_0 \times V_0 = P_1 \times V_1$ is satisfied, in which $V_0$ stands for the internal volume on the spring side (volume of the communication space chamber 18) before operation, $P_0$ for the internal pressure on the spring side (pressure in the communication space chamber 18) before operation, $V_1$ stands for the internal volume on the spring side after operation and $P_1$ for the internal pressure on the spring side after operation. In addition, torque $\Delta T$ assumed when the output shaft 17 is positioned at an angle of 45° is expressed by a product of the volume of the cylinder chamber by the increment of the internal pressure by the distance between the pin and the output shaft, i.e. $\Delta T = \pi \times D^2/4 \times \Delta P \times e$, wherein D denotes the diameter of the cylinder, $\pi \times D^2/4$ the cross-sectional area in the cylinder, $\Delta P$ the increment of the internal pressure and e the amount of eccentricity (m).

In the case of the actuator shown in the drawings, since the increment $\Delta V$ of the internal volume is expressed as $D \times L_0 - L_1$ when the length of the secondary space 20b is L, $\Delta V = \pi \times D^2/4 \times (L_0 - L_1)$ and, in the sample of the present measurement test, $\Delta V = 2.21 \times 10^5$ (mm$^3$). In addition, $V_0 = V_1 + \Delta V$, e=0.022 (m) and the atmospheric pressure $P_n$=1 (atm)≈0.1013.

When the actuator adopts the positive pressure specifications, since the initial pressure in the communication space chamber, i.e. the pressure after the back motion of the spring 43 resulting in the spring having assumed a state of its snap action, is the atmospheric pressure, $P_0 = P_n$ and, in view of the Boyle-Charle's law and the size of the actuator, $P_1 = V_0/V_1 \times P_0 = (9.25 \times 10^5 + 2.21 \times 10^5)/(9.25 \times 10^5) \times 0.1013 = 0.1255$ (MPa). In this case, since the pressure increment $\Delta P = P_1 - P_0$, when the aforementioned numerals are substituted, $\Delta P = P_1 - P_0 = 0.1255 - 0.1013 \approx 0.024$ (MPa). Therefore, from the torque increment $\Delta T = \pi \times D^2/4 \times \Delta P \times e$, $\Delta T$ at a position of an angle of 45°=$\pi \times (0.08)^2/4 \times 0.024/2 \times 0.022 \times 10^6 = 1.33$ (Nm).

On the other hand, when the actuator adopts the negative pressure specifications, the pressure in the communication space chamber after operation, i.e. the pressure after the forth motion of the spring 43 by the compressed air resulting in the spring 43 having assumed a state of being compressed, is the atmospheric pressure, $P_1 = P_n$. In view of the Boyle-Charle's law and the size of the actuator, $P_0 = V_1/V_0 \times P_1 = (9.25 \times 10^5)/((9.25 \times 10^5) + 2.21 \times 10^5)) \times 0.1013 = 0.0818$ (MPa). In this case, since the pressure increment $\Delta P = P_0 - P_1$, when the aforementioned numerals are substituted, $\Delta P = P_0 - P_1 = 0.0818 - 0.1013 \approx 0.020$ (MPa). Therefore, from the torque increment $\Delta T = \pi \times D^2/4 \times \Delta P \times e$, $\Delta T = \pi \times (0.08)^2/4 \times (-0.020)/2 \times 0.022 \times 10^6 = -1.11$ (Nm). Incidentally, since the rotation angle of the output shaft is 45°, the pressure increment $\Delta P$ becomes one half as compared with that when the valve is opened or closed at an angle of 90°.

Here, in the spring-return, pneumatic actuators of this kind, when the relationship between the divergence of the output shaft represented on the axis of abscissas and the output characteristic represented on the axis of ordinate is shown in a graph as the "divergence-output characteristics," the output characteristic is described by a parabola, with the divergence of 45° as its apex. This indicates that the output of the actuator is most stable at a divergence of around 45° and that the divergence is that showing the smallest output constituting the basis of selection of actuators suitable for valves to be driven. Therefore, the divergence of 45° has been adopted as the divergence to be used during the pressure and torque measurement tests.

In the case of an actuator operated by means of compressed air, with the spiracle (air supply and exhaust port on the secondary side of the piston) stopped up, theoretically, the pressure in the communication space chamber 18 is increased by 0.024 MPa, the torque during the operation when the output shaft is rotated by 45° is decreased by 1.33 Nm, and the torque during the springing-back operation is increased by 1.33 Nm. On the other hand, when the spring is operated, with the spiracle stopped up in the state of the spring being compressed, the pressure in the communication space chamber 18 is decreased by 0.020 MPa, the torque during the operation when the output shaft is rotated by 45° is increased by 1.11 Nm, and the torque during the springing-back operation is decreased by 1.11 Nm. Therefore, when comparing the actuators adopting the positive-pressure and negative-pressure specifications, the increment and decrement of the torque are smaller in the case of the actuator adopting the negative-pressure specifications.

The pressure and torque of an actuator is actually measured. The actuator used in the tests is that according to the present embodiment and having one of the two air-supply and exhaust ports of an ordinary actuator, i.e. the air supply and exhaust port (spiracle) 27 in the cylinder on the secondary side of the piston, stopped up. This actuator has a structure failing to breathe (supply and exhaust) the air. For the sake of convenience, therefore, this actuator is called an apneic actuator. In addition, this actuator is not provided with the through hole 34.

The variation in pressure was measured, with the air supply and exhaust port (spiracle) 27 on the secondary side of the piston 13 connected to a gauge (pressure gauge, negative pressure gauge). On the other hand, the variation in torque was measured in the state in which the output shaft was rotated by 45° using a torque-measuring instrument. Particularly, in the case of the actuator adopting the positive pressure specification, the procedure comprised the steps of fully opening the valve, with the spiracle 27 stopped up, gradually releasing the compressed air in the cylinder chamber from that state and fixing the output shaft 17 at a position at which the output shaft assumed an angle of 45°. In the actuator adopting the negative pressure specification, the procedure comprised the steps of stopping up the spiracle 27, with the valve fully opened, gradually releasing the compressed air in the cylinder chamber from that state and fixing the output shaft 17 at a position at which the output shaft assumed an ankle of 45°.

In the actuator adopting the positive pressure actuator, the actuator was operated by means of air pressure to measure the variation in pressure within the communication space chamber 18 every one elapsed unit of time. The results of this measurement are shown in Table 1 below and the graph of FIG. 8.

TABLE 1

| Time (sec) | Pressure (MPa) |
| --- | --- |
| 0 | 0.100 |
| 10 | 0.040 |
| 20 | 0.028 |
| 30 | 0.025 |
| 60 | 0.023 |
| 300 | 0.023 |
| 600 | 0.023 |
| 1800 | 0.023 |
| Theoretical value | 0.024 |

Figure 8:
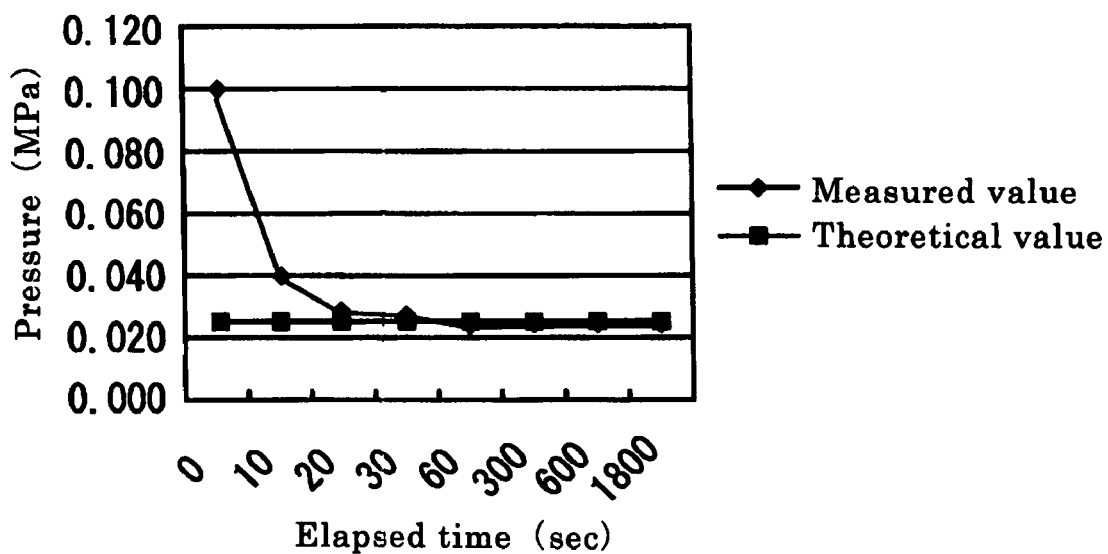
FIG. 8 is a graph showing a variation in pressure within an actuator of specifications for a positive pressure.

It was found from the graph of FIG. 8 and above Table 1 that the pressure became a positive pressure of 0.1 MPa immediately after the operation and was made close to the aforementioned theoretical value ΔP (=0.024 MPa) in about one minute.

In the actuator adopting the negative pressure specifications, the spiracle 27 was stopped up in the state wherein the valve was fully opened and the actuator was operated by the springing-back operation of the spring to measure the variation in pressure within the communication space chamber 18 every one elapsed time. The results of this measurement are shown in Table 2 below and the graph of FIG. 9.

TABLE 2

| Time (sec) | Pressure (MPa) |
| --- | --- |
| 0 | −0.05 |
| 10 | −0.038 |
| 20 | −0.03 |
| 30 | −0.028 |
| 60 | −0.023 |
| 300 | −0.022 |
| 600 | −0.021 |
| 1800 | −0.021 |
| Theoretical value | −0.020 |

Figure 9:
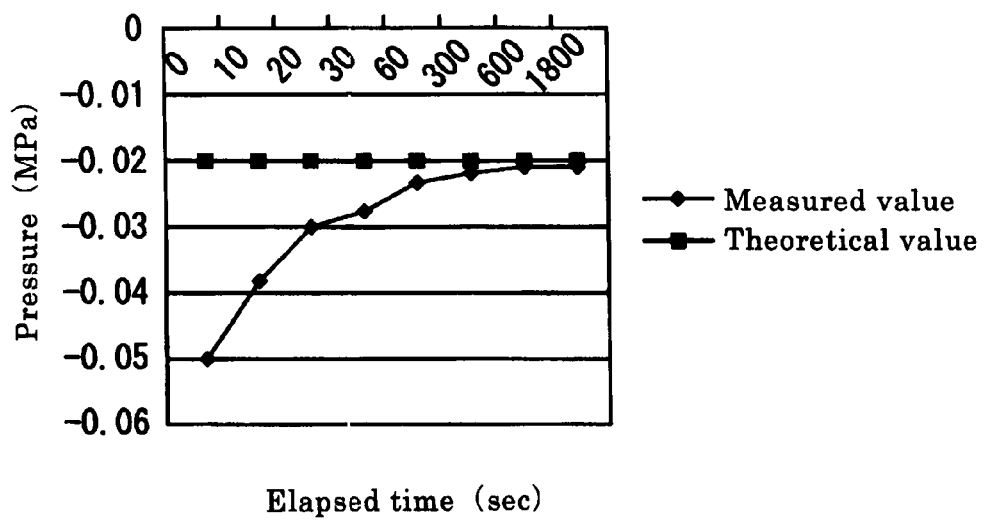
FIG. 9 is a graph showing a variation in pressure within an actuator of specifications for a negative pressure.

It was found from the graph of FIG. 9 and above Table 2 that the pressure became a negative pressure of ±0.05 MPa immediately after the operation and was made close to the aforementioned theoretical value ΔP (=0.020 MPa) in about one minute.

It is found from the results of the measurement tests that both the actuators having positive-pressure and negative-pressure specifications exhibit pressure values close to the theoretical values, respectively, in about one minute. This is because the pressure within the cylinder chamber 20 is abruptly varied immediately after the operation of the piston 13 and passage of time is required from the inflow of the pressure into the housing chamber 30 and spring chamber 20 until the homogeneous pressure over the entire interior of the actuator. At this time, the value in the positive pressure specifications becomes larger than the theoretical value and that in the negative pressure specifications becomes smaller than the theoretical value.

The air within the cylinder chamber 20 moves, with a prescribed time, from the gap of a bearing (not shown) having the piston rod 12 mounted thereon toward the housing chamber 30 and spring chamber 40 to restore to the theoretical value. Incidentally, by connecting the cylinder chamber 20, housing chamber 30 and spring chamber 40 via the through hole 34 to move the air smoothly without encountering any stress, the operation torque can be made close to the theoretical immediately after the operation.

Then, the torques assumed at the time of the springing-back motion (back motion) and at the time of the compressed air operation (forth motion) in each of the apneic actuators (adopting the positive-pressure and negative-pressure specifications, respectively) according to the present invention and a prior art actuator having respirability (actuator allowing the air supply and exhaust port on the side of the communication space chamber to communicate with the external atmosphere) were measured, respectively. The results of this measurement are shown in Table 3 below and the graph of FIG. 10. In the graph, the "torque variation" means the increment or decrement of the actually measured value in the present invention relative to the value in the prior art.

TABLE 3

| | | Torque actually measured (Nm) | | Torque variation (Nm) | |
| --- | --- | --- | --- | --- | --- |
| | | At the time of springing-back motion | At the time of compressed air operation | At the time of springing-back motion | At the time of compressed air operation |
| Prior art | | 19.6 | 22.7 | — | — |
| Present invention | Positive pressure spec. | 22.5 | 20.9 | 3.0 | −1.8 |
| | Negative pressure spec. | 19.0 | 23.0 | −0.6 | 0.4 |

Figure 10:
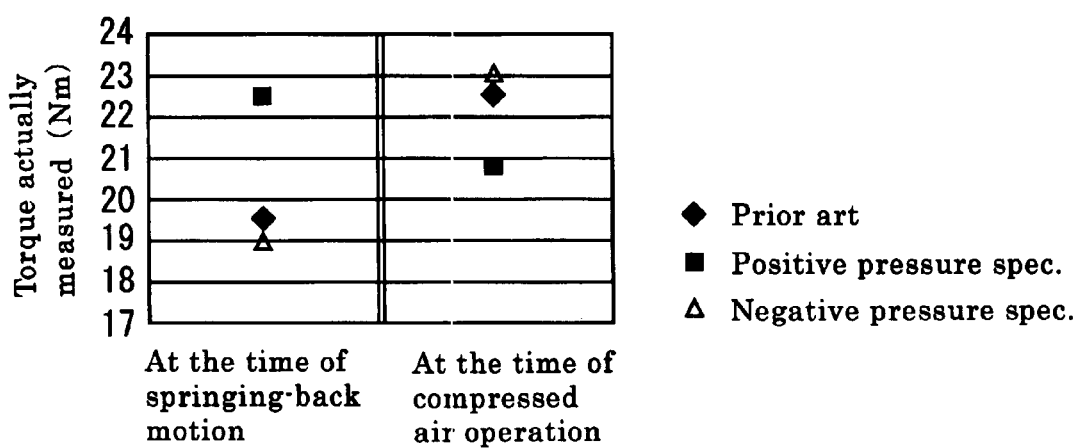
FIG. 10 is a graph showing torque measurement results of an actuator.

It was found from the graph of FIG. 10 and above Table 3 that the apneic actuator adopting the positive pressure specifications exhibited a torque increment of about 15% at the time of the springing-back motion and a torque decrement of about 8% at the time of the compressed air operation as compared with the actuator having respirability and that the apneic actuator adopting the negative pressure specifications exhibited a torque decrement of about 3% at the time of the springing-back motion and a torque increment of about 2% at the time of the compressed air operation as compared with the actuator having respirability. It was confirmed from this fact that the actuator adopting the negative pressure specifications had a smaller influence on the output torque than and was superior to that adopting the positive pressure specifications.

As described in the foregoing, both the actuators adopting the positive-pressure and negative-pressure specifications could suppress the torque or pressure variation to a smaller value as compared with the actuator having respirability. Furthermore, it was confirmed that both the theoretical and actually measured values of the torque or pressure variation were smaller in the case of the negative pressure in the communication space chamber and were substantially the same as those in the case of the prior art and was therefore proved that use of the actuator adopting the negative pressure specifications was desirable.

Thus, the spring-return, pneumatic actuator according to the present invention is practicable irrespective of the size of its actuator main body and capable of producing a stable output torque of the output shaft in any case. To be specific, the present invention can be applied to an actuator in which the volume of the communication space chamber is up to $15.0 \times 10^7$ mm$^3$ at the time of the springing-back motion and up to $12.0 \times 10^7$ mm$^3$ at the time of the compressed air operation.

An example was cited herein, in which the volume of the communication space chamber 18 of an actuator was $70.0 \times 10^5$ mm$^3$ at the time of the springing-back motion and $59.0 \times 10^5$ mm$^3$ at the time of the compressed air operation. The pressures at the time of the springing-back motion and at the time of the compressed air operation were measured in the same manner as described above. The results of this measurement are shown in Tables 4 and 5 below and the graphs of FIGS. 11 and 12. Incidentally, the actuator has the check valve 26 of FIGS. 4 and 5 disposed thereon and the through hole 34 formed therein. In addition, the time required for each of the motion and the operation is about one second.

TABLE 4

Positive Pressure Measurement

| Time (sec) | Pressure (MPa) |
|---|---|
| 0 | 0.022 |
| 10 | 0.020 |
| 20 | 0.020 |
| 30 | 0.020 |
| 60 | 0.020 |
| 300 | 0.020 |
| 600 | 0.020 |
| 1800 | 0.020 |
| Theoretical value | 0.019 |

TABLE 5

Negative Pressure Measurement

| Time (sec) | Pressure (MPa) |
|---|---|
| 0 | −0.017 |
| 10 | −0.014 |
| 20 | −0.014 |
| 30 | −0.014 |
| 60 | −0.014 |
| 300 | −0.014 |
| 600 | −0.014 |
| 1800 | −0.014 |
| Theoretical value | −0.016 |

Figure 11:
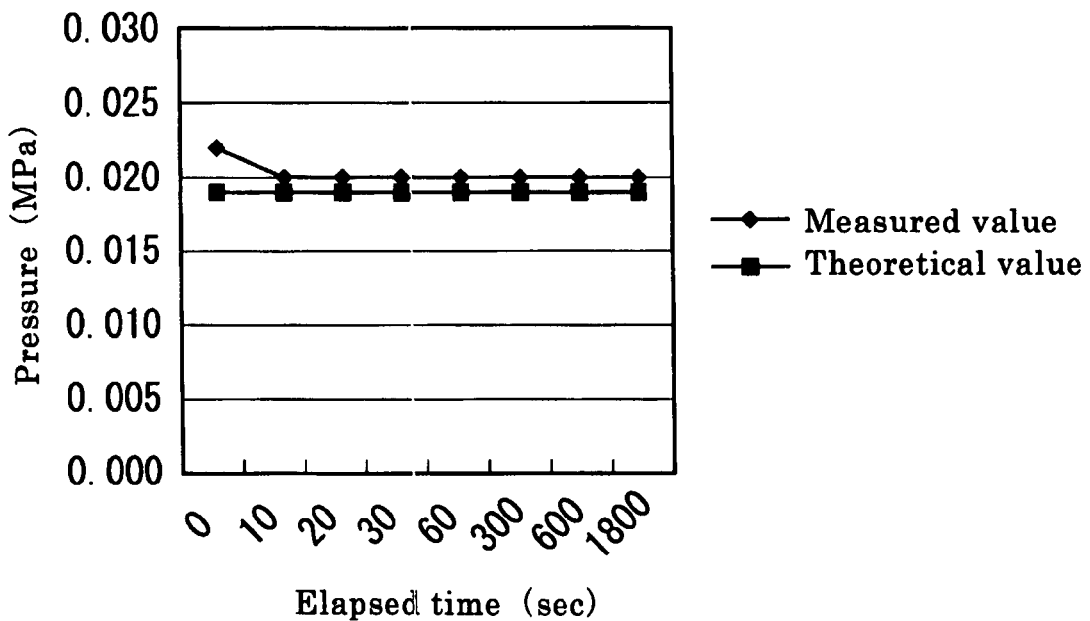
FIG. 11 is a graph showing a variation in pressure within an actuator of specifications for a positive pressure having a different volume.
Figure 12:
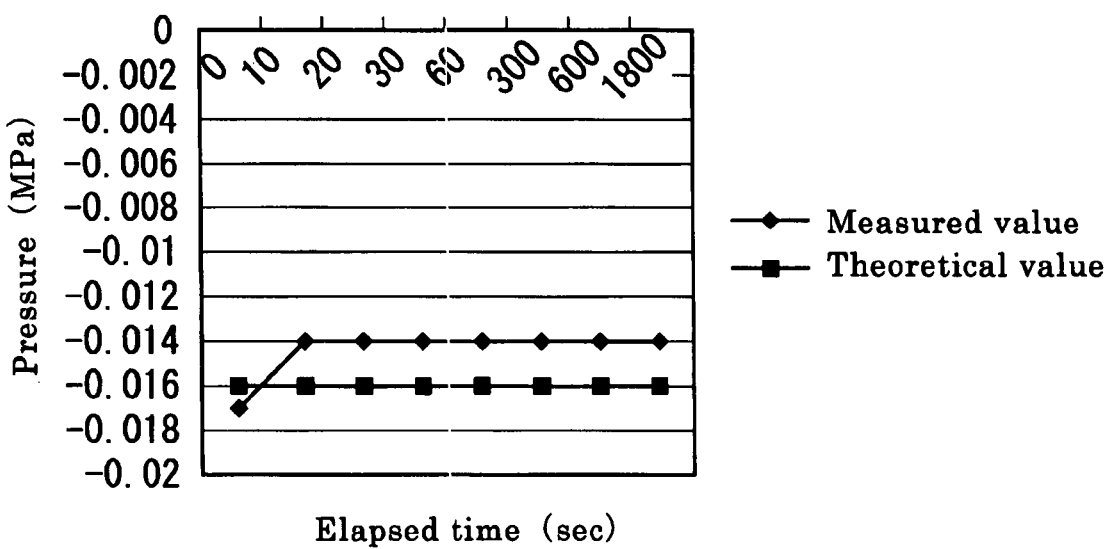
FIG. 12 is a graph showing a variation in pressure within an actuator of specifications for a negative pressure having a different volume.

It was found from the graphs of FIGS. 11 and 12 and above Tables 4 and 5 that the actuator in this example could acquire the stable internal pressure close to the theoretical value about 10 seconds after the operation.

What is claimed is:

1. A spring-return, pneumatic actuator comprising:
   a casing having an air supply and exhaust vent;
   a piston arranged within said casing, said piston being configured to move due to air supplied and discharged from said air supply and exhaust vent on a primary side of said piston;
   a piston rod connected to said piston;
   a conversion mechanism for converting a reciprocating linear motion of said piston into a rotary motion;
   a spring for undergoing a snap action for applying a spring force against said piston during reciprocating motion of said piston;
   a sealed communication space chamber comprising a spring chamber housing said spring and a secondary side chamber of said casing located at a secondary side of said piston, said sealed communication space chamber having communication parts to allow said spring chamber to communicate with said secondary side chamber, said communication space chamber being sealed and having a predetermined volume such that a rise in pressure during the reciprocating motion of said piston is no greater than 0.02 MPa; and
   a check valve communicating with said sealed communication space chamber to allow only escape of air from inside said sealed communication space chamber if a set pressure is reached or exceeded within said sealed communication space chamber.

2. The actuator of claim 1, wherein said casing comprises:
   a cylinder chamber accommodating therein said piston connected to said piston rod, said cylinder chamber comprising said secondary side chamber; and
   a housing chamber accommodating therein said conversion mechanism; and
   said spring chamber accommodating therein said spring.

3. The actuator of claim 2, wherein each of said communication parts comprises one of a through-hole for allowing communication between said secondary side chamber and said housing chamber, and a through-hole for allowing communication between said housing chamber and spring chamber.

4. The actuator of claim 3, wherein said housing chamber is shaped to have a contour substantially identical to a contour of said cylinder chamber and said spring chamber.

5. The actuator of claim 4, wherein said communication space chamber is sealed so as to have an internal pressure set to be no greater than atmospheric pressure.

6. The actuator of claim 3, wherein said communication space chamber is sealed so as to have an internal pressure set to be no greater than atmospheric pressure.

7. The actuator of claim 2, wherein said housing chamber is shaped to have a contour substantially identical to a contour of said cylinder chamber and said spring chamber.

8. The actuator of claim 7, wherein said communication space chamber is sealed so as to have an internal pressure set to be no greater than atmospheric pressure.

9. The actuator of claim 2, wherein said communication space chamber is sealed so as to have an internal pressure set to be no greater than atmospheric pressure.

10. The actuator of claim 1, wherein said communication space chamber is sealed so as to have an internal pressure set to be no greater than atmospheric pressure.

11. The actuator of claim 1, wherein said casing encloses said sealed communication space chamber, said communication space chamber comprising:
- a cylinder chamber accommodating therein said piston connected to said piston rod, said cylinder chamber comprising said secondary side chamber; and
- a housing chamber accommodating therein said conversion mechanism; and
- said spring chamber accommodating therein said spring;

wherein said cylinder chamber, said housing chamber, and said spring chamber are arranged to communicate with each other via said communication parts.

12. The actuator of claim 11, wherein said cylinder chamber comprises an adjustable stopper bolt for adjusting an amount of travel of said piston in a back direction, and said spring chamber comprises an adjustable rod for adjusting an amount of travel of said piston in a forth direction opposite said back direction.

* * * * *